(12) United States Patent
Bond

(10) Patent No.: US 10,471,587 B1
(45) Date of Patent: Nov. 12, 2019

(54) FIRE HOSE GRAPPLING ASSEMBLY

(71) Applicant: Dennis Bond, Hamilton, OH (US)

(72) Inventor: Dennis Bond, Hamilton, OH (US)

( * ) Notice: Subject to any disclaimer, the term of this patent is extended or adjusted under 35 U.S.C. 154(b) by 50 days.

(21) Appl. No.: 16/051,922

(22) Filed: Aug. 1, 2018

(51) Int. Cl.
- *B25J 1/04* (2006.01)
- *B65G 7/00* (2006.01)
- *A47F 13/06* (2006.01)

(52) U.S. Cl.
CPC ............ *B25J 1/04* (2013.01); *A47F 13/06* (2013.01); *B65G 7/00* (2013.01)

(58) Field of Classification Search
CPC ... A47F 13/06; B25J 1/04; B25G 1/04; B65G 7/00
USPC ............ 294/4, 175, 209–211; 15/144.4
See application file for complete search history.

(56) References Cited

U.S. PATENT DOCUMENTS

| | | | | |
|---|---|---|---|---|
| 3,643,991 A * | 2/1972 | Eaton | ............... | B25B 27/14 294/15 |
| 4,196,491 A * | 4/1980 | Baril | ............... | B05C 17/022 15/144.4 |
| 5,924,157 A * | 7/1999 | Barela | ............... | A47L 13/00 15/104.002 |
| 6,447,033 B1 | 9/2002 | Konczak | | |
| 6,499,778 B2 | 12/2002 | Boulay | | |
| D497,086 S | 10/2004 | Lopes | | |
| 6,918,415 B1 * | 7/2005 | Johnson | ............... | B67D 7/40 141/1 |
| 7,490,880 B1 | 2/2009 | Matsui | | |
| 7,673,912 B2 | 3/2010 | Breininger | | |
| 7,699,368 B2 | 4/2010 | Nicol | | |
| 7,862,093 B2 * | 1/2011 | Stiltner | ............... | B65G 7/10 294/15 |
| 8,544,916 B2 * | 10/2013 | Acquah | ............... | H02G 1/10 114/221 R |
| 9,381,845 B2 * | 7/2016 | Miers | ............... | B60P 1/00 |
| 2004/0174027 A1 | 9/2004 | Bennett | | |

\* cited by examiner

*Primary Examiner* — Dean J Kramer

(57) ABSTRACT

A fire hose grappling assembly for loading fire hose onto a fire truck includes a fire truck that has a hose bed. A fire hose is positionable on the hose bed for storing the fire hose. A grapple is provided and the grapple is gripped by a user for loading the fire hose onto the hose bed. The grapple is laterally extendable across the hose bed to releasably engage the fire hose. Moreover, the grapple is urgeable across the hose bed when the grapple releasably engages the fire hose thereby facilitating the user to urge the fire hose across the hose bed. In this way the user can load the fire hose onto the fire truck without requiring the user to mount the fire truck.

4 Claims, 4 Drawing Sheets

FIRE HOSE GRAPPLING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to grappling devices and more particularly pertains to a new grappling device for loading fire hose onto a fire truck.

BRIEF SUMMARY OF THE INVENTION

An embodiment of the disclosure meets the needs presented above by generally comprising a fire truck that has a hose bed. A fire hose is positionable on the hose bed for storing the fire hose. A grapple is provided and the grapple is gripped by a user for loading the fire hose onto the hose bed. The grapple is laterally extendable across the hose bed to releasably engage the fire hose. Moreover, the grapple is urgeable across the hose bed when the grapple releasably engages the fire hose thereby facilitating the user to urge the fire hose across the hose bed. In this way the user can load the fire hose onto the fire truck without requiring the user to mount the fire truck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
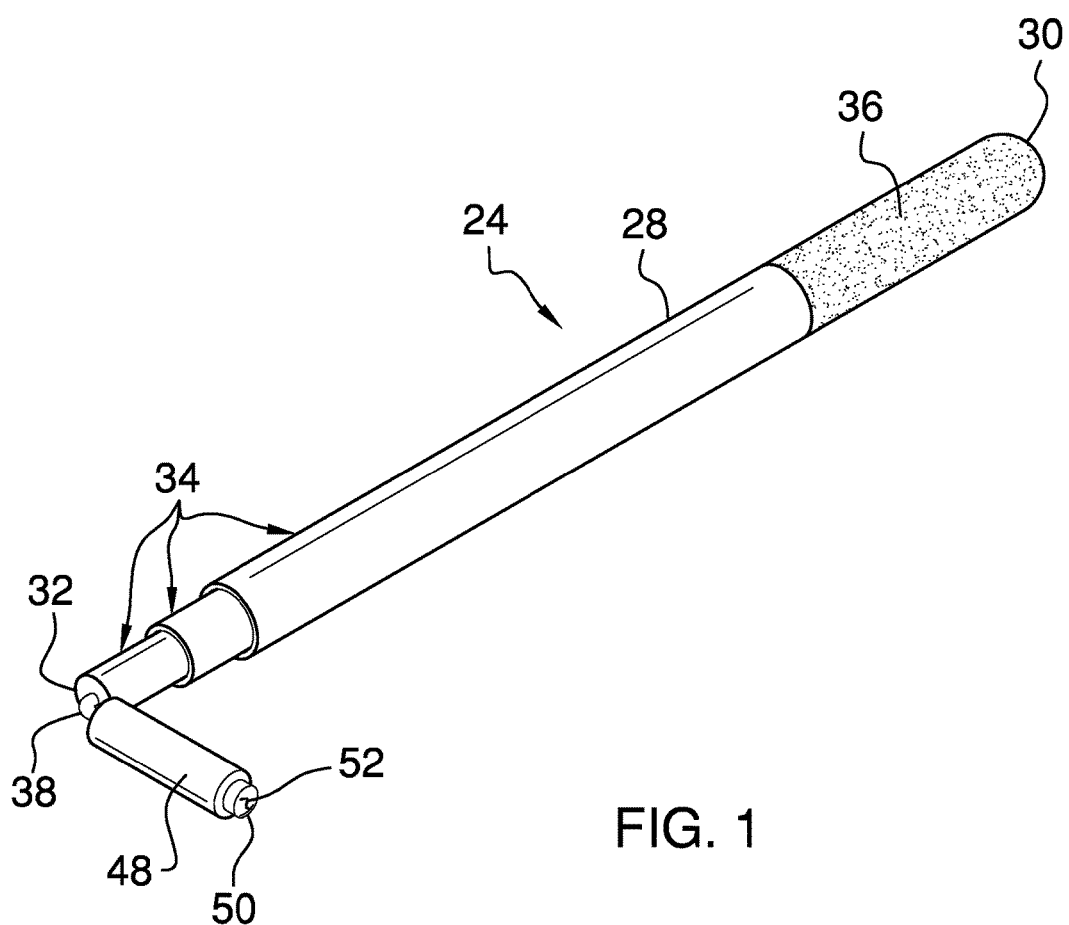
FIG. 1 is a front perspective view of a grapple of a fire hose grappling assembly according to an embodiment of the disclosure.
Figure 2:
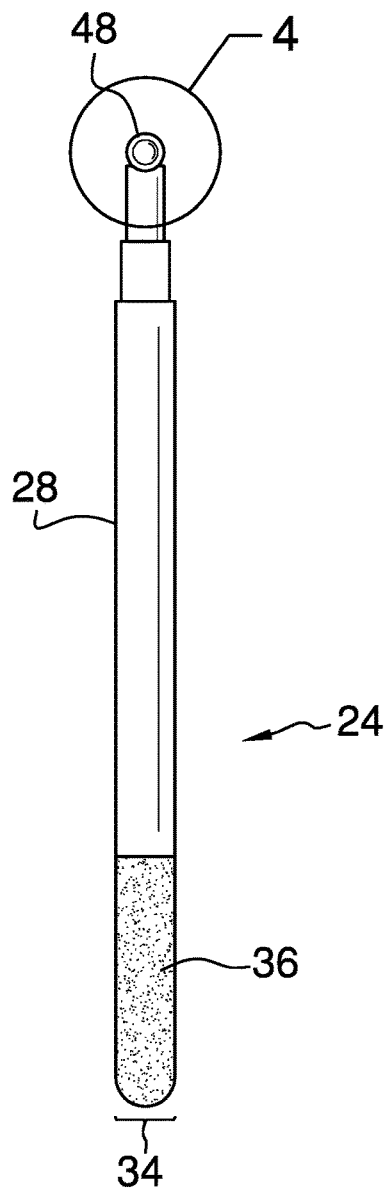
FIG. 2 is a top view of a grapple of an embodiment of the disclosure.
Figure 3:
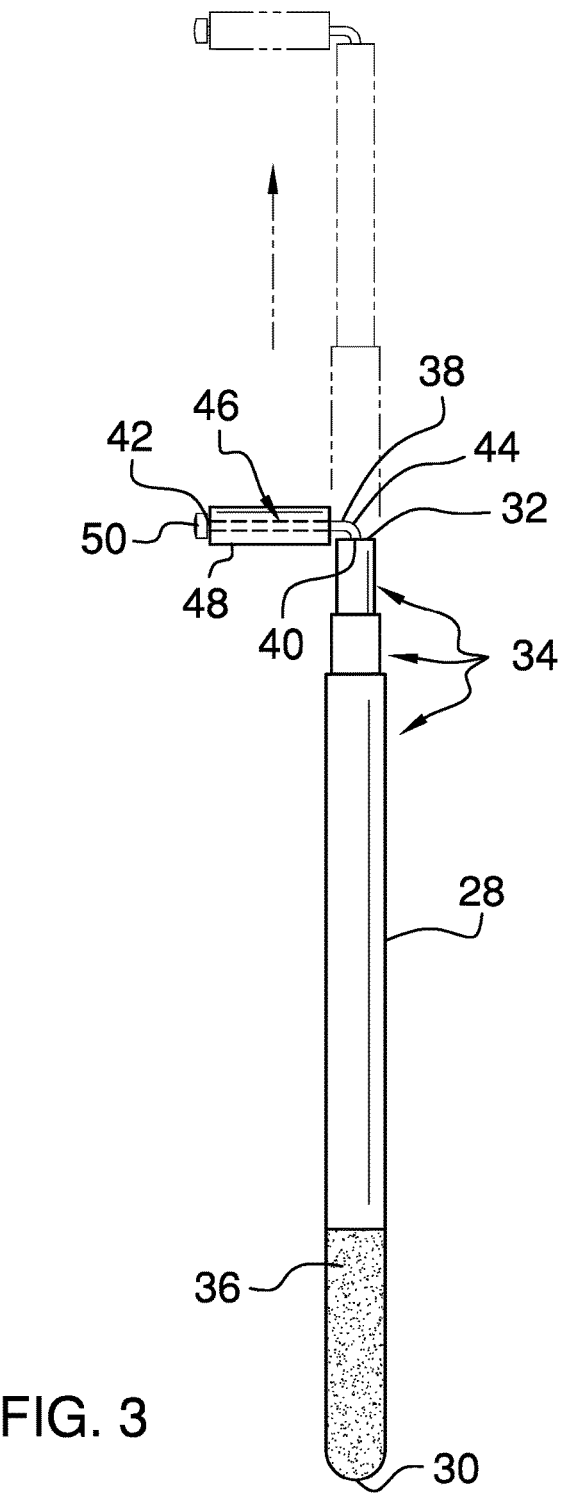
FIG. 3 is a right side view of a grapple of an embodiment of the disclosure.
Figure 4:
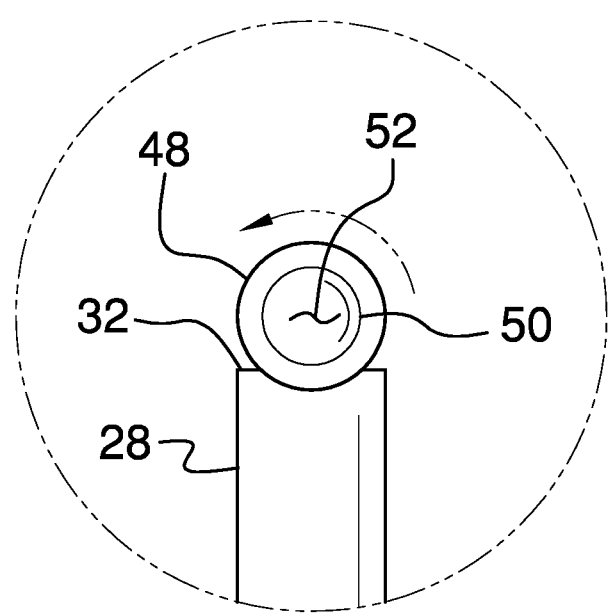
FIG. 4 is a detail view taken from circle 4 of FIG. 2 of an embodiment of the disclosure.
Figure 5:
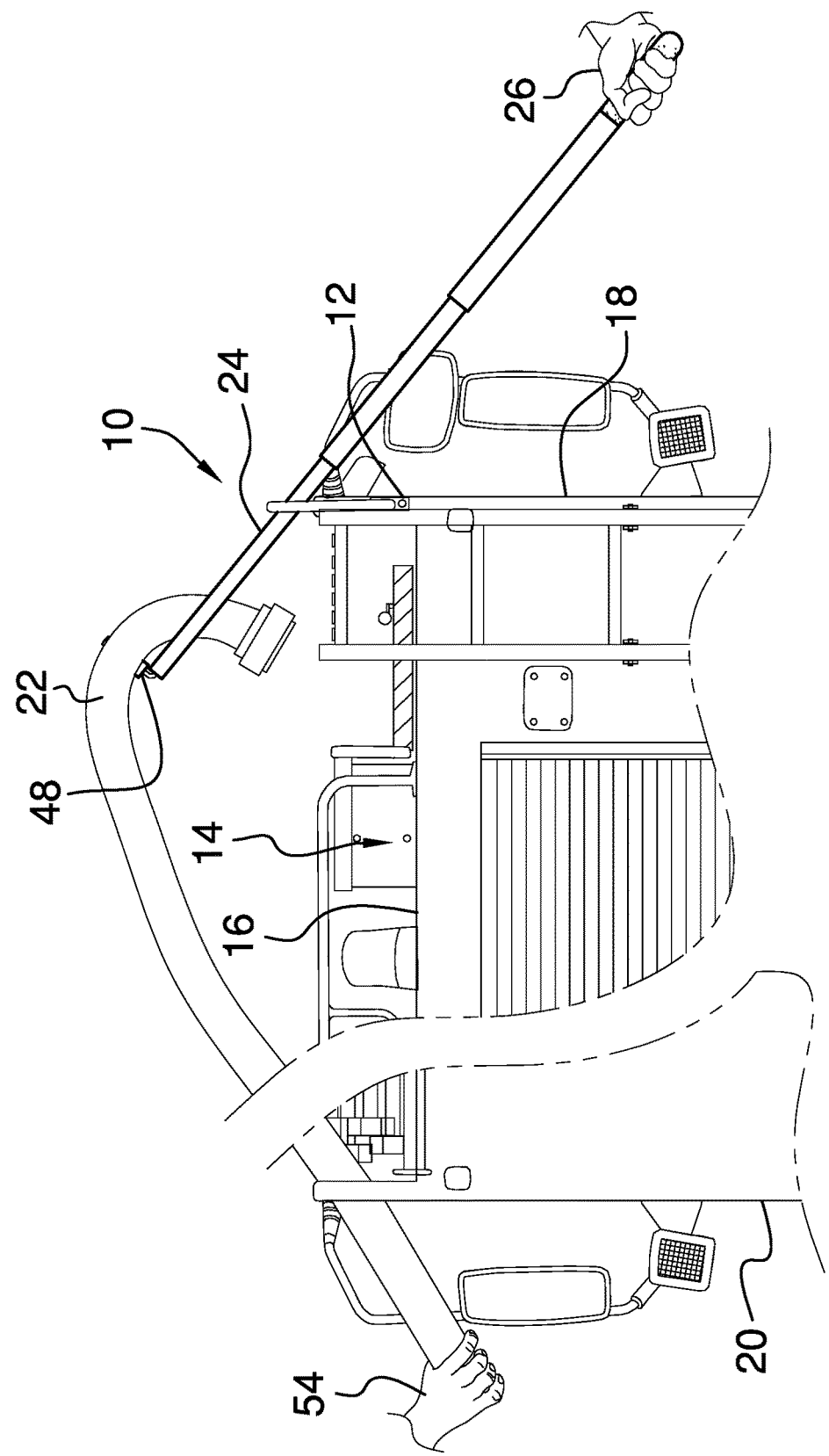
FIG. 5 is a perspective in-use view of an embodiment of the disclosure.

With reference now to the drawings, and in particular to FIGS. 1 through 5 thereof, a new grappling device embodying the principles and concepts of an embodiment of the disclosure and generally designated by the reference numeral 10 will be described.

As best illustrated in FIGS. 1 through 5, the fire hose grappling assembly 10 generally comprises a fire truck 12 that has a hose bed 14. The fire truck 12 has a top side 16, a first lateral side 18 and a second lateral side 20 and the hose bed 14 is positioned on the top side 16. The fire truck 12 may be a fire truck 12 of any conventional design, including but not being limited to, conventional fire appliances, turntable ladders and tower ladders. A fire hose 22 is positionable on the hose bed 14 for storing the fire hose 22. The fire hose 22 may be any approved fire hose 22 commonly employed by firefighters in the US.

A grapple 24 is provided and the grapple 24 is gripped by a first user 26 for loading the fire hose 22 onto the hose bed 14. The grapple 24 is laterally extendable across the hose bed 14 to releasably engage the fire hose 22. Moreover, the grapple 24 is urgeable across the hose bed 14 when the grapple 24 releasably engages the fire hose 22 thereby facilitating the first user 26 to urge the fire hose 22 across the hose bed 14. In this way the grapple 24 facilitates the fire hose 22 to be loaded into the hose bed 14 without requiring the first user 26 to mount the fire truck 12. This facilitates the first user 26 to avoid being positioned beneath an extended ladder or other elevated object above the hose bed 14. In this way the grapple 24 enhances the safety of the first user 26 with respect to being crushed by a collapsing ladder or the like. Moreover, the grapple 24 is blunted thereby inhibiting the grapple 24 from piercing or otherwise compromising the fire hose 22.

The grapple 24 comprises a pole 28 that has a first end 30 and a second end 32, and the pole 28 is elongated between the first 30 and second 32 ends. The pole 28 comprises a plurality of sections 34 that is each slidably coupled together such that the pole 28 has a telescopically adjustable length. Additionally, the pole 28 is extendable laterally across the hose bed 14 when the fire hose 22 is being loaded into the hose bed 14. The pole 28 may have a maximum length of approximately 2.0 meters. A grip 36 is coupled around the pole 28 for gripping and the grip 36 extends from the first end 30 toward the second end 32. The grip 36 is comprised of a resiliently compressible material, such as rubber or the like, for enhancing gripping the pole 28.

The grapple 24 includes a rod 38 that has a primary end 40 and a secondary end 42, and the primary end 40 is coupled to the second end 32 of the pole 28. The rod 38 has a bend 44 thereon to define a roller section 46 of the rod 38 that is oriented perpendicular to an axis extending through the first 30 and second 32 ends of the pole 28. Moreover, the roller section 46 extends laterally away from the second end 32 of the pole 28.

The grapple 24 includes a roller 48 that is rotatably positioned around the roller section 46 of the rod 38. The roller 48 is positionable to engage the fire hose 22 when the pole 28 is extended laterally across the hose bed 14. The pole 28 is rotated thereby facilitating the fire hose 22 to loop around the roller 48 for urging the fire hose 22 across the hose bed 14. Additionally, the roller 48 may be an elongated cylinder or other similarly elongated roller. A stop 50 is coupled to the secondary end 42 of the rod 38 and the roller 48 abuts the stop 50 thereby retaining the roller 48 on the roller 48 portion of the rod 38. The stop 50 has an outwardly facing surface 52 and the outwardly facing surface 52 is rounded thereby inhibiting the stop 50 from damaging the fire hose 22.

In use, the existing conventional method of loading a fire hose 22 onto a fire truck 12 requires a minimum of three individuals having one of the individuals standing on top of the fire truck 12. Thus, the individual on top of the fire truck 12 is exposed to a crushing hazard when the fire truck 12 has a ladder or other elevated object. The grapple 24 eliminates the need for the individual to stand on top of the fire truck 12 to load the fire hose 22. The first user 26 stands on the first lateral side 18 of the fire truck 12 and a second user 54 stands on the second lateral side 20 of the fire truck 12. The second user 54 lifts the fire hose 22 onto the hose bed 14 and the first user 26 extends the pole 28 across the hose bed 14 to engage the fire hose 22. The first user 26 manipulates the pole 28 to facilitate the roller 48 to engage the fire hose 22. Thus, the first user 26 can drag the fire hose 22 across the hose bed 14. The second user 54 continually lifts the fire hose 22 onto the hose bed 14 and the first user 26 continually drags the fire hose 22 across the hose bed 14 until the entire length of the fire hose 22 is loaded onto the hose bed 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fire hose grappling system comprising:
a fire truck having a hose bed;
a fire hose being positionable on said hose bed for storing said fire hose; and
a grapple being grippable by a user for loading said fire hose onto said hose bed, said grapple being laterally extendable across said hose bed to releasably engage said fire hose, said grapple being urgeable across said hose bed when said grapple releasably engages said fire hose thereby facilitating the user to urge said fire hose across said hose bed without requiring the user to mount said fire truck, said grapple being blunted thereby inhibiting said grapple from piercing said fire hose, said grapple comprising
a pole having a first end and a second end, said pole being elongated between said first and second ends, said pole comprising a plurality of sections each being slidably coupled together such that said pole has a telescopically adjustable length, said pole being extendable laterally across said hose bed,
a rod having a primary end and a secondary end, said primary end being coupled to said second end of said pole, said rod having a bend thereon to define a roller section of said rod being oriented and in a fixed position perpendicular to an axis extending through said first and second ends of said pole, said roller section extending laterally away from said second end of said pole, and
a roller being rotatably positioned around said roller section of said rod, said roller being positionable to engage said fire hose when said pole is extended laterally across said hose bed thereby facilitating said fire hose to loop around said roller for urging said fire hose across said hose bed.

2. The system according to claim 1, further comprising a grip being coupled around said pole for gripping, said grip extending from said first end toward said second end, said grip being comprised of a resiliently compressible material for enhancing gripping said pole.

3. The system according to claim 1, further comprising a stop being coupled to said secondary end of said rod, said roller abutting said stop thereby retaining said roller on said roller section of said rod.

4. A fire hose grappling system comprising:
a fire truck having a hose bed;
a fire hose being positionable on said hose bed for storing said fire hose; and
a grapple being gripped by a user for loading said fire hose onto said hose bed, said grapple being laterally extendable across said hose bed to releasably engage said fire hose, said grapple being urgeable across said hose bed when said grapple releasably engages said fire hose thereby facilitating the user to urge said fire hose across said hose bed without requiring the user to mount said fire truck, said grapple being blunted thereby inhibiting said grapple from piercing said fire hose, said grapple comprising:
a pole having a first end and a second end, said pole being elongated between said first and second ends, said pole comprising a plurality of sections each being slidably coupled together such that said pole has a telescopically adjustable length, said pole being extendable laterally across said hose bed;
a grip being coupled around said pole for gripping, said grip extending from said first end toward said second end, said grip being comprised of a resiliently compressible material for enhancing gripping said pole;
a rod having a primary end and a secondary end, said primary end being coupled to said second end of said pole, said rod having a bend thereon to define a roller section of said rod being oriented and in a fixed position perpendicular to an axis extending through said first and second ends of said pole, said roller section extending laterally away from said second end of said pole;
a roller being rotatably positioned around said roller section of said rod, said roller being positionable to engage said fire hose when said pole is extended laterally across said hose bed thereby facilitating said fire hose to loop around said roller for urging said fire hose across said hose bed; and
a stop being coupled to said secondary end of said rod, said roller abutting said stop thereby retaining said roller on said roller section of said rod.

\* \* \* \* \*